US009455939B2

(12) United States Patent
Meisels et al.

(10) Patent No.: US 9,455,939 B2
(45) Date of Patent: Sep. 27, 2016

(54) MOST RECENTLY USED LIST FOR ATTACHING FILES TO MESSAGES

(75) Inventors: Joshua Adam Meisels, Seattle, WA (US); Daniel Paul Costenaro, Bellevue, WA (US); Jedidiah Brown, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/096,922

(22) Filed: Apr. 28, 2011

(65) Prior Publication Data
US 2012/0278406 A1 Nov. 1, 2012

(51) Int. Cl.
G06F 15/16 (2006.01)
H04L 12/58 (2006.01)
G06Q 10/10 (2012.01)

(52) U.S. Cl.
CPC .............. H04L 51/08 (2013.01); G06Q 10/107 (2013.01)

(58) Field of Classification Search
CPC ........................................ H04L 12/58
USPC .......................................... 709/206
See application file for complete search history.

(56) References Cited

U.S. PATENT DOCUMENTS

| 7,043,529 | B1 * | 5/2006 | Simonoff ............... H04L 67/02 709/204 |
| 7,340,686 | B2 | 3/2008 | Matthews et al. ............ 715/779 |
| 7,412,447 | B2 * | 8/2008 | Hilbert et al. |
| 7,568,148 | B1 | 7/2009 | Bharat et al. ................. 715/200 |
| 8,001,120 | B2 * | 8/2011 | Todd et al. .................... 707/736 |
| 8,195,744 | B2 * | 6/2012 | Julia et al. .................... 709/205 |
| 8,892,560 | B2 * | 11/2014 | Secord et al. ................ 707/738 |
| 2002/0059384 | A1 * | 5/2002 | Kaars ............................ 709/206 |
| 2003/0040833 | A1 * | 2/2003 | Gasiorek ............ G05B 19/0426 700/181 |
| 2005/0182798 | A1 | 8/2005 | Todd et al. |
| 2005/0192966 | A1 * | 9/2005 | Hilbert et al. .................. 707/10 |
| 2007/0271344 | A1 * | 11/2007 | Danasekaran et al. ........ 709/206 |
| 2008/0005685 | A1 | 1/2008 | Drews et al. ................ 715/764 |
| 2008/0077990 | A1 | 3/2008 | Bednar |
| 2008/0172663 | A1 | 7/2008 | Lee |
| 2009/0006285 | A1 | 1/2009 | Meek et al. .................... 706/12 |

(Continued)

FOREIGN PATENT DOCUMENTS

| JP | 2002049569 | 2/2002 |
| JP | 2005141438 | 6/2005 |

OTHER PUBLICATIONS

Marshall, J.; "Displaying More Files in the Recently Used File List"; accessed Jan. 3, 2011 at http://wordprocessing.about.com/cs/quicktips/qt/Filelist.htm; 1 pg.

(Continued)

*Primary Examiner* — Douglas Blair
(74) *Attorney, Agent, or Firm* — Anand Gupta; Tom Wong; Micky Minhas

(57) ABSTRACT

A user may select an attachment for an electronic message from a most recently used (MRU) list of files. For example, when a user is composing an electronic message, they may select a file to attach to the message from the MRU list. The recently used files that are included within the MRU list may be related to or more applications/locations and/or one or more computing devices. For example, the MRU list may include files accessed by one or more different authoring applications and/or files that have recently been accessed/created that are associated with the user.

20 Claims, 5 Drawing Sheets

(56) References Cited

U.S. PATENT DOCUMENTS

2009/0030872 A1  1/2009  Brezina
2009/0119712 A1* 5/2009  Kim .................. H04N 5/44543
                                                  725/40
2009/0144283 A1  6/2009  Clark et al.
2013/0086612 A1* 4/2013  Kim .................... H04N 21/482
                                                  725/40

OTHER PUBLICATIONS

Violeta; "*My Recent Documents displayed in Windows XP*"; Apr. 9, 2008; accessed Jan. 3, 2011 at http://www.alltipsandtricks.com/my-recent-documents-displayed-in-windows-xp/; 5 pgs.

Win7heads.com; "*Recent Documents for Attachment*"; accessed Jan. 3, 2011 at http://www.win7heads.com/networking/37099-recent-documents-attachment-html; 2 pgs.

International Search Report mailed Nov. 26, 2012, in PCT/US2012/035711.

European Search Report for Application No. 12776668.1 mailed Aug. 22, 2014.

Chinese 1st Office Action in Application 201280020462.9, mailed Jan. 12, 2016, 14 pgs.

European Communication in Application 12776668.1, mailed Sep. 9, 2014, 1page.

Japanese Office Action in Application 2014508172, mailed Mar. 18, 2016, 6 pgs.

Russian Office Action in Application 2013147827 mailed Mar. 21, 2016, 5 pgs. (No English translation).

Australian Office Action in Application 2012249339, mailed Jun. 30, 2016, 3 pgs.

\* cited by examiner

MOST RECENTLY USED LIST FOR ATTACHING FILES TO MESSAGES

BACKGROUND

Users routinely send attachments using electronic messages. When attaching documents or other files to a message, a user locates the file and attaches the file to the message. The file may be attached through selection of a menu item and/or through a drag and drop operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A user may select an attachment for an electronic message from a most recently used (MRU) list of files. For example, when a user is composing an electronic message, they may select a file to attach to the message from the MRU list. The recently used files that are included within the MRU list may be related to one or more applications/locations and may be associated with one or more computing devices. For example, the MRU list may include files accessed by one or more different authoring applications and/or files that have recently been accessed/created that are associated with the user on one or more of the computing devices they utilize.

DETAILED DESCRIPTION

Figure 1:
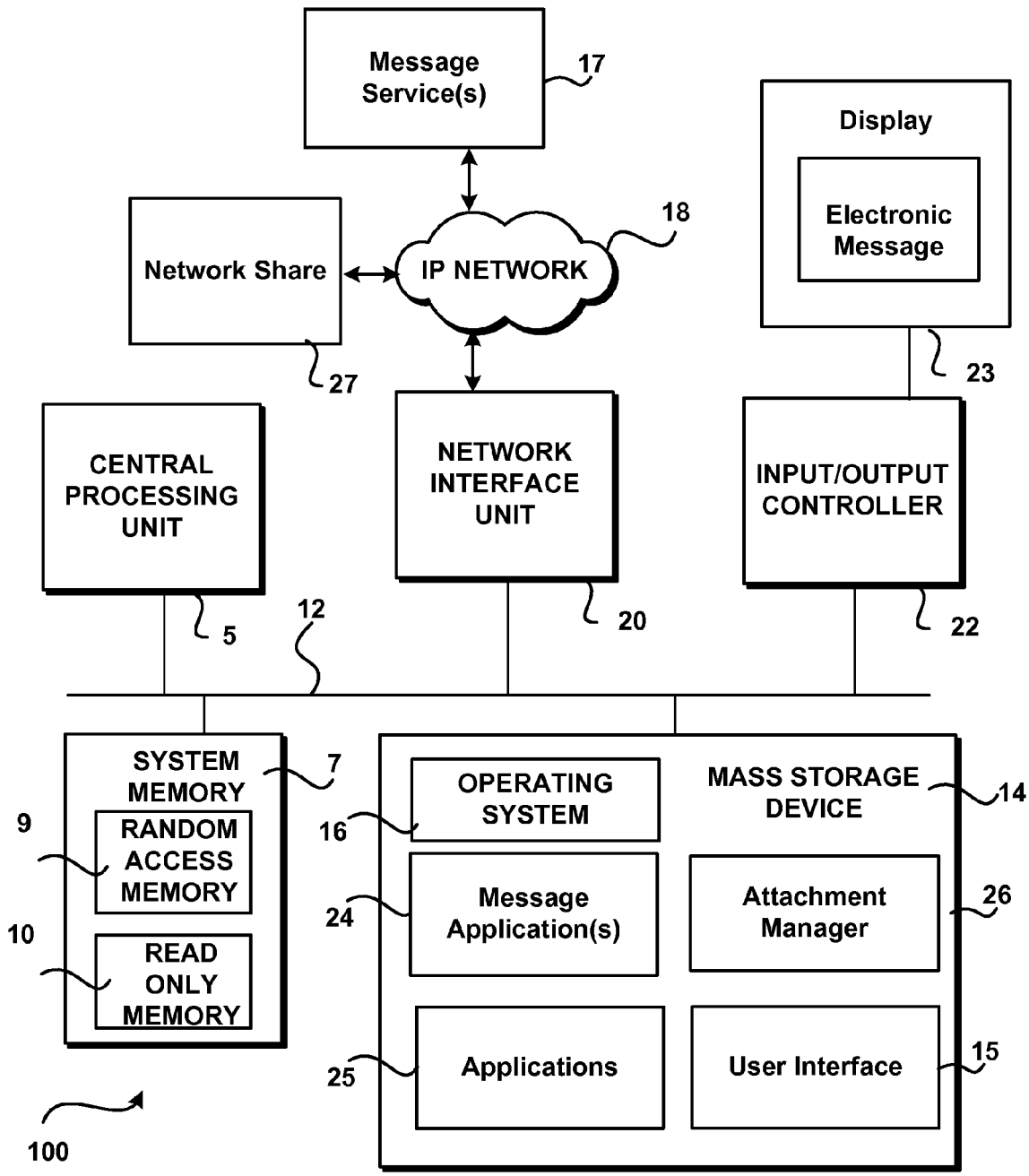
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, net book, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, messaging application(s) 24, Application(s) 25, and attachment manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more messaging application programs 24, and applications 25 such as: a word processing application, a spreadsheet application, a video application, a picture application, a presentation application and a Web browser.

A user interface 15 is used by a user to interact with applications and documents. Message application(s) 24 may be one or more different messaging applications. For example, computer 100 may include an email application, an Instant Messaging (IM) application, an SMS, MMS application, a real-time information network (e.g. Twitter® interface), a social networking application, and the like. According to an embodiment, messaging application 24 is an email application, such as MICROSOFT OUTLOOK®. The messaging application(s) may be client based and/or web based. For example, a network based message service 17 may be used, such as: MICROSOFT WINDOWS LIVE or some other network based email and messaging service. Applications 25 may be client based and/or network based applications (e.g. word processing applications, spreadsheet applications, photo applications and the like).

Network share 27 is configured to store content (e.g. documents, spreadsheet, Web content, and the like) that are accessible to one or more users through IP network 18. For example, network share 27 may store content that is accessible by users located at one or more locations.

Attachment manager 26 is configured to display a most recently used (MRU) list of files from which one or more files may be selected to be attached to an electronic message. The MRU may be created from files that are accessible to the computing device displaying the MRU. For example, when the MRU is displayed on a user's laptop, any recently used files by the user that are accessible from the laptop may be displayed (i.e. files that are network accessible). The selected file may be attached to the message and/or a link to the file may be included with the message. The term "link" refers to an address that represents a location of content. For example, a link may be in the form of a Uniform Resource Locator (URL) that specifies a network location of where the attachment/content is stored. Clicking the link generally retrieves the content that is pointed to by the link. Attachment manager 26 may be located externally from an application, e.g. messaging application 24, as shown or may be a part of an application. Further, all/some of the functionality provided by attachment manager 26 may be located internally/externally from a messaging application.

According to an embodiment, attachment manager 26 is configured to present linked content and/or attachments in an attachment area of an electronic message. Attachment manager 26 is configured to obtain and display an MRU list. A user may select an attachment for an electronic message from the displayed most recently used (MRU) list of files using user interface 15. For example, when a user is composing an electronic message, they may select a file to attach to the message from the MRU list. The recently used files that are included within the MRU list may be related to one or more applications/locations and/or one or more computing devices. For example, the MRU list may include files accessed by one or more different authoring applications and/or files that have recently been accessed/created that are associated with the user. More details regarding the attachment manager are disclosed below.

Figure 2:
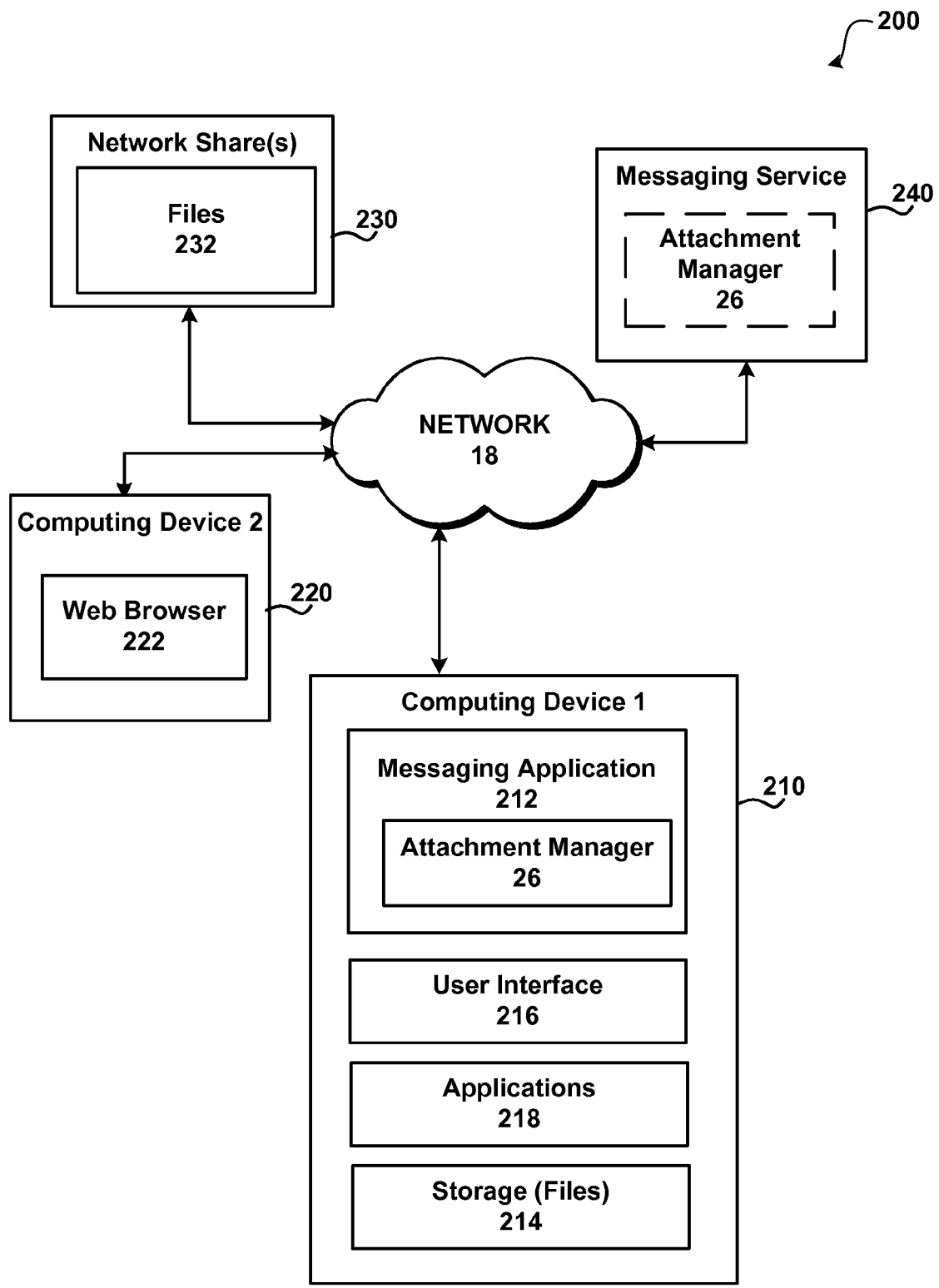
FIG. 2 shows a system for selecting an attachment for a message from an MRU list.

FIG. 2 shows a system for selecting an attachment for a message from an MRU list. As illustrated, system 200 includes computing device 1 (210), computing device 2 (220), network share(s) 230 and messaging service 240.

The computing devices may be any type of computing device that is configured to perform the operations relating to sending and receiving electronic messages that include attachments and links to content. For example, some of the computing devices may be: mobile computing devices (e.g. cellular phones, tablets, smart phones, laptops, and the like); desktop computing devices and servers. Some computing devices may be arranged to provide an online service (e.g. messaging service 240 that is configured for sending and receiving electronic messages), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, network share 230 and messaging service 240.

Computing device 1 includes messaging application 212, applications 218, storage 214 and user interface 216. As illustrated, computing device 1 is used by a user to interact with electronic messages, content in a network share (e.g. files 232), applications 218 and the like.

User interface (UI) 216 is used to interact with applications and content, such as messaging application 212, applications 218 and files (214, 232). One or more user interfaces of one or more types may be used to interact with the content. For example, UI 216 may include the use of a context menu, a menu within a menu bar, a menu item selected from a ribbon user interface, a graphical menu, and the like. Generally, UI 216 is configured such that a user may easily interact with content and electronic messages. For example, a user may simply select a file from an MRU list using UI 216 to attach the file to an electronic message.

Messaging application 212 may be a client based application, such as an email application, an Instant Messaging Application, a social media application, and the like. Generally, messaging application 212 is used to send and receive electronic messages of one or more types. A network based messaging service 240 may be used in addition to messaging application 212 or instead of one or more of the different messaging applications. For example, a web interface may be used to access messaging service 240.

Messaging service 240 may be used to process electronic messages between one or more computing devices, such as computing device 1 and computing device 2. Messaging service 240 may be configured to process different message types, such as SMS, MMS, email, messages for social networks and the like. Messaging service 240 may be configured with the functionality of attachment manager 26 and one or more message types may be used to communicate the electronic messages the selected attachment(s).

Computing device 2 includes one or more applications, such as a web browser (222) that may be configured to access a messaging service, such as a web based email service and to interact with content. For example, a web browser may be used to access messaging service 240 and create an electronic message including one or more attachments that are selected from an MRU list.

One or more network shares (e.g. Network share 230) may be used to store content, such as files 232. The content may be any type of content that is linked/attached to a message, such as word processing documents, spreadsheets, slides, website content, pictures, videos and the like Network share 230 is accessible by the computing devices that interact with the content. The network share may be associated with an online service that supports online access/ interaction with content. The network share(s) may be associated with one or more online services. For example, different network shares may be associated with different types of attachments (e.g. a network share for a video service, picture service, document service, and the like.)

Attachment manager 26 is configured to obtain and display an MRU list of files that may be attached/linked to an electronic message. The files may be any type of files that may be attached/linked to an electronic message, such as word processing documents, spreadsheets, slides, pictures, videos, website content and the like. The files that are included within the MRU list are based on files that were recently used. The recently used files may be associated with one or more different computing devices. For example, a user may use a first computing device to access some files and then use a second computing device to access other files. In this example, a portion of the files that were accessed by the first computing device may be included in the MRU that is displayed by the second computing device (e.g. the files accessed by the first computing device that are accessible the second computing device when the MRU is displayed). According to an embodiment, the files included in the MRU are the files that were most recently accessed by one or more different applications and/or files that were recently accessed by one or more computing device. For example, the MRU list may include files from word processing applications, presentation applications, spreadsheet applications, picture applications, video applications, web-based applications, recently accessed files from data storage, and the like. According to an embodiment, authoring applications (e.g. an application that can create a file) are used to determine a list of the files that were recently used. The files to include within the MRU list may be determined in different ways. For example, the applications may be monitored to determine a list of the recently used files and/or a list of the files accessed by an application may be obtained from the application and/or another source (e.g. an operating system). The obtained list of files may be filtered based on various criteria (e.g. show the last X number of files from each of these different applications, show the files accessed within a predetermined time period, and the like).

Upon selection of one or more of the displayed files within the MRU list, attachment manager 26 is configured to attach the selected file and/or a link to the selected file to the electronic message. For example, instead of attaching the actual file to the message, attachment manager 26 may include a link to the selected file within the message. Attachment manager 26 may determine to include a link based on various criteria. For example, a user may indicate to include a link to a selection of a file from the MRU list rather then attaching the file to the message. The indication to use a link may be made through a selection of a user interface option and/or a user preference. A file location may also be used as criteria. For example, when the file is located at a shared location, a link to the shared file may be included instead of/in addition to the attachment. A size threshold may also be used to determine when to include a link within the message instead of attaching the selected file (e.g. the size of the selected file(s) is larger then a predetermined size threshold such as 1 MB, 5 MB, 10 MB . . . ). The predetermined size threshold may be configured by an authorized user (e.g. system administrator). Once the file(s) are selected from the MRU list, the electronic message is sent to the determined recipients.

Figure 3:
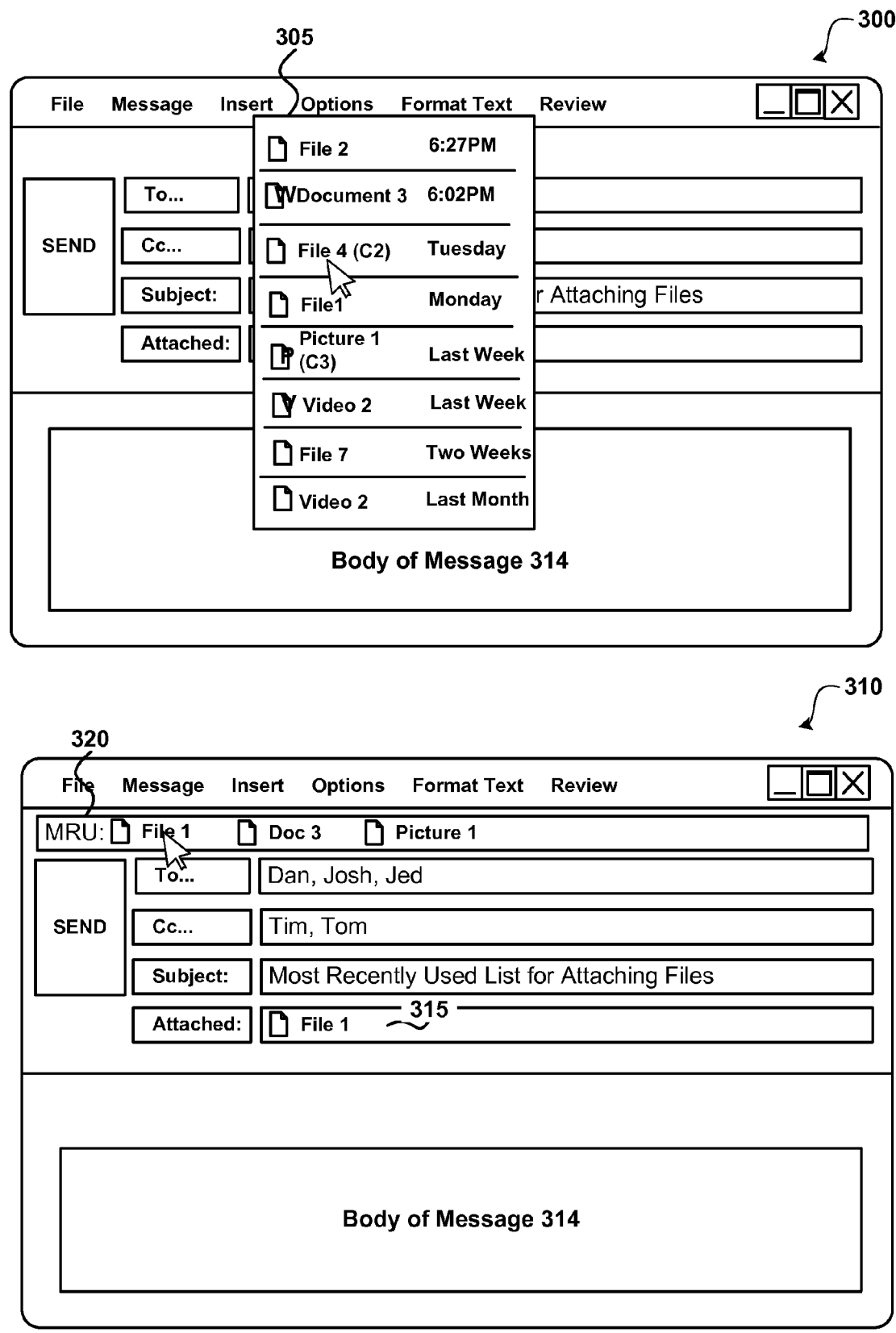
FIG. 3 shows a display of an electronic message including a display of an MRU list that is used to select an attachment.

FIG. 3 shows a display of an electronic message including a display of an MRU list that is used to select an attachment. As illustrated, message 300 comprises a To: field, a Cc: field, a Subject field:, an Attached field; body of the message 314 and MRU list 305. More or fewer fields may be included with the electronic message.

The electronic message may be accessed a number of ways. For example, a web browser may access an electronic mail service, an email application on a computing device may be configured to send/receive emails from one or more different services, and the like.

When electronic message 300 is being composed, an MRU list (e.g. MRU list 305) may be displayed to select one or more attachments to include with the message. The attachments may be to any type of content, such as word processing documents, spreadsheets, slides, website content, pictures, videos and the like. Generally, the attachment may be to any type of content that is accessible by a computing device.

MRU list 305 displays a list of files that were recently accessed/used by one or more different applications. As illustrated, MRU list 305 in message 300 shows a list of files and a time when each file was accessed. In MRU list 305 two files (File 4 and Picture 1) were accessed from different computing devices (computer C2 and computer C3) as indicated by the "(C2)" and "(C3)" designations. Other designations may be used. For example, the files within the MRU list may be highlighted based on the computing device from which they were last accessed, a different icon may be used, a name of the computing device may be shown, an icon may change for the file, and the like. According to an embodiment, the MRU list does not graphically indicate a computing device that last accessed the file. The MRU list may be displayed using different methods. For example, a user may select a menu option (e.g. Insert) to display the MRU list and/or the MRU list (or a portion of the MRU list) may be displayed with the message (e.g. MRU list 320). Selecting one of the files listed in the MRU list (e.g. MRU 305, MRU 320) attaches the selected file to the message (e.g. selecting File 1 from MRU 320 attaches File 1 315 to the attachment area).

The attachment area may be located within many different areas of the display. Generally, the attachment area is located such that the display of the attached area remains visible even though the body of the message is scrolled to change the view of the message. A graphical indicator, such as an icon, may be displayed within the attachment area near the attachment/link to provide additional information relating to the attachment. The graphical indicator may be selected to indicate a type of the content and/or other characteristics relating to the linked content. For example, a document icon may be used to show the content is a document, a web icon may be used for web content, a spreadsheet icon may be used for spreadsheets, a picture icon may be used for pictures, a message icon may be used for messages, an online service icon may be used to show where the attachment has been uploaded (e.g. a video service icon to indicate that the attachment has been uploaded to video service 1, a picture service icon . . . ) and the like.

Figure 4:
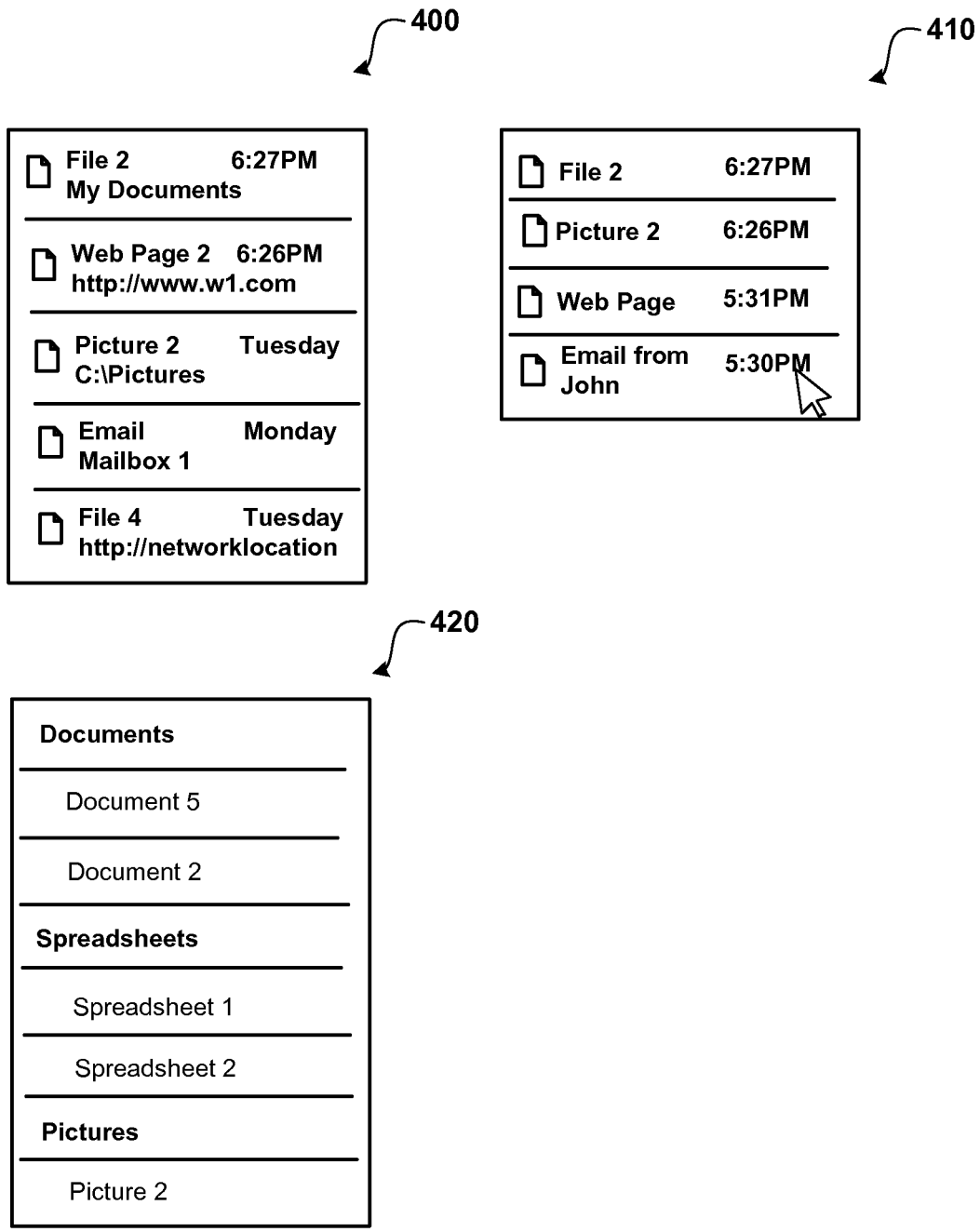
FIG. 4 shows examples of different MRU lists that display recently used files.

FIG. 4 shows examples of different MRU lists that display recently used files.

As illustrated, MRU list 400 shows a list of recently used files that includes a name of the file, a time the file was used and a location of where the file is located. As can be seen, MRU list 400 shows that the files may be located locally to the computing device (e.g. File 2, Picture 2) and/or the files may located at a network location (e.g. File 4). The file may be any type of file that is used (e.g. documents, messages, pictures, web pages visited, and the like). The list of files shown within the MRU list may be based on preferences. For example, a user may specify to show all files that were recently accessed, a portion of files (e.g. files used from a list of selected applications, files edited within a predetermined time period) and the like.

MRU list 410 shows a list of recently used files that were used within a predetermined time period. According to an embodiment, the list of files may be based on files that were accessed/used within a predetermined time period (e.g. last five minutes, ten minutes, fifteen minutes, hour, day, week and the like). In the example illustrated, MRU 410 shows a list of files that were accessed/used within the last hour.

MRU list 420 shows a list of recently used files that are organized by type of file. As illustrated, MRU 420 shows two files of type document, two files of type spreadsheet and one file of type pictures. The types of files may be any type of file (e.g. word processing documents, spreadsheet documents, emails, Instant Messages, Web pages, pictures, videos, drawings, and the like). The number of documents that are displayed with each type of file may also be configured. For example, the number of each type of document may be limited to a certain number of documents.

Figure 5:
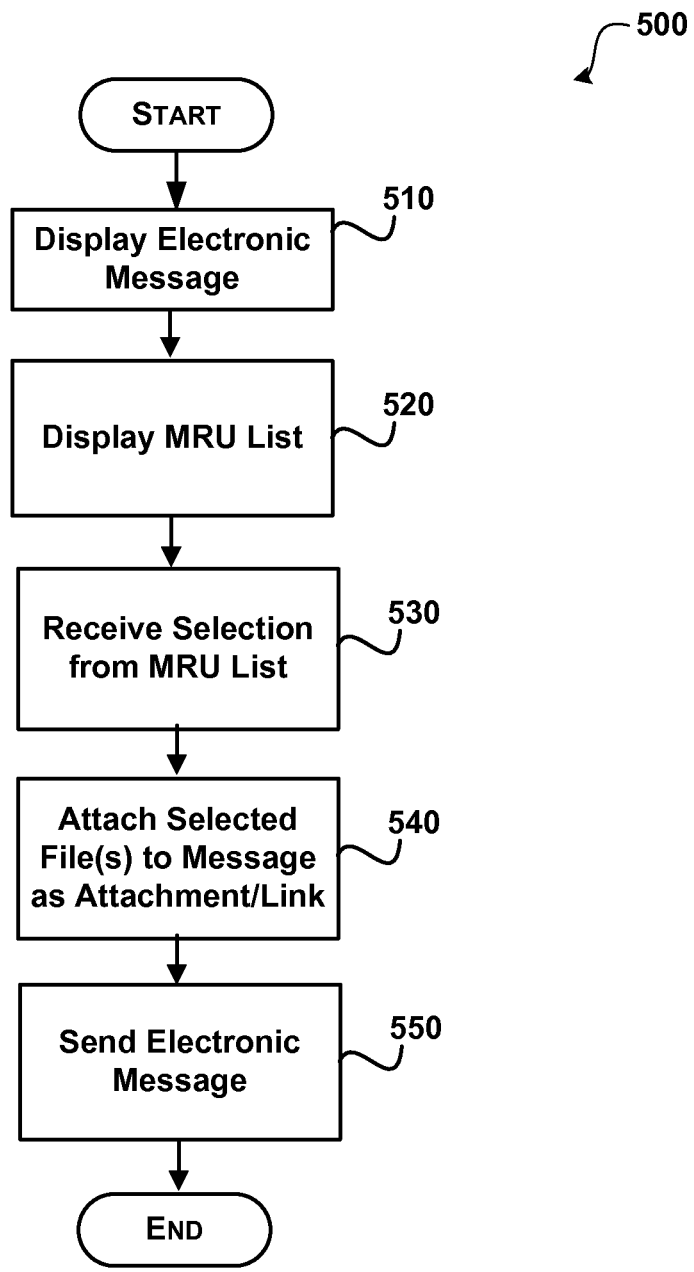
FIG. 5 shows an illustrative process for selecting an attachment to an electronic message using an MRU list.

FIG. 5 shows an illustrative process for selecting an attachment to an electronic message using an MRU list. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof After a start block, process 500 moves to operation 510, where the electronic message is displayed. The electronic message may be any electronic message that includes the ability to attach content. According to an embodiment, the electronic messages are email messages. Other messages may also be used attachments, such as SMS, MMS, Instant Messages, social network messages, and the like.

Flowing to operation 520, an MRU list is displayed with the display of the electronic message. The MRU may be displayed manually/automatically. For example, the MRU may be displayed automatically with the display of the electronic message and/or in response to a user action (e.g. selecting a menu option, clicking within an attachment area, and the like). The files that are included within the MRU are based on the most recently used files that are associated with one or more different applications. According to an embodiment, the MRU list includes the accessible files that were recently accessed by the user from one or more computing devices. Instead of a user having to search for a file that they just worked on to attach to a message, the user may simply select the file from the MRU list.

Moving to operation 530, one or more files are selected from the MRU list. For example, a user may click on a file within the list to designate the file as an attachment.

Transitioning to operation 540, the selected files are attached to the message. The file may be attached to the message and/or a link to the file may be included within the message.

Flowing to operation 550, the electronic message including the attachments/link to attachments is sent to the recipients.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for selecting an attachment for an electronic message, comprising:
displaying the electronic message within a messaging application user interface;
displaying a most recently used (MRU) list within the messaging application user interface while displaying the electronic message, wherein the MRU list comprises a list of files including files recently accessed from a first computing device and files recently accessed from a second computing device;
presenting indicia for at least one file, the indicia indicating whether the first computing device or the second device most recently accessed the at least one file;
receiving a selection of a file that is displayed within the MRU list;
attaching the selected file to the electronic message; and
sending the electronic message to a recipient using the messaging application.

2. The method of claim 1, further comprising creating the MRU list from files recently accessed by different applications by both the first computing device and the second computing device.

3. The method of claim 2, wherein the different applications are applications comprising at least one of: a word processing application; a spreadsheet application; and a messaging application.

4. The method of claim 1, further comprising creating the MRU list from files recently stored on a client computing device.

5. The method of claim 1, wherein displaying the MRU list comprises displaying a name of each file and a time when the file was recently used.

6. The method of claim 1, further comprising obtaining preferences that indicate a type of file and a type of application to include within the MRU list.

7. The method of claim 1, further comprising obtaining the MRU list from another application.

8. The method of claim 1, wherein attaching the selected file to the electronic message comprises attaching a link to the selected file.

9. The method of claim 1, wherein the messaging application user interface is part of a social media application for a mobile device.

10. A system for selecting an attachment for an electronic message, comprising:
at least one processor; and
a memory operatively connected to the at least one processor, the memory storing instructions that, when executed by the processor, perform a method comprising:
displaying the electronic message;
displaying a most recently used (MRU) list that comprises a list of files including files recently accessed from a first computing device and files recently accessed from a second computing device, wherein the MRU list is displayed within the same user interface as the electronic message;

presenting indicia for at least one file, the indicia indicating whether the first computing device or the second device most recently accessed the at least one file;

receiving a selection of a file that is displayed within the MRU list;

attaching the selected file to the electronic message; and sending the electronic message to a recipient.

11. The system of claim 10, wherein the method further comprises creating the MRU list from files recently accessed by different applications accessed from the first and second computing devices.

12. The system of claim 11, wherein the different applications are authoring applications comprising at least one of: a word processing application; a spreadsheet application; and a messaging application.

13. The system of claim 10, wherein the first computing device and second computing device are both mobile devices.

14. The system of claim 10, wherein displaying the MRU list comprises displaying a name of each file and a time when the file was recently used.

15. The system of claim 10, wherein the method further comprises obtaining preferences that indicate a type of file and a type of application to include within the MRU list.

16. The system of claim 10, wherein attaching the selected file to the electronic message comprises attaching a link to the selected file.

17. A system for selecting an attachment for an electronic message, comprising:

a network connection that is configured to connect to a network;

a processor, memory, and a computer-readable storage medium;

an operating environment stored on the computer-readable storage medium and executing on the processor;

a messaging application; and an attachment manager operating in conjunction with the messaging application that is configured to perform actions comprising:

displaying an electronic message that is being composed;

in response to a selection of an option in the messaging application, displaying a most recently used (MRU) list that comprises a list of files including files recently accessed from a first computing device and files recently accessed from a second computing device wherein the MRU list is displayed in a user interface that also includes the electronic message;

presenting indicia for at least one file, the indicia indicating whether the first computing device or the second device most recently accessed the at least one file;

receiving a selection of a file that is displayed within the MRU list;

attaching the selected file to the electronic message; and sending the electronic message to a recipient.

18. The system of claim 17, further comprising creating the MRU list from files recently accessed by different applications and files accessed from both the first computing device and the second computing device.

19. The system of claim 18, wherein the different applications are authoring applications comprising at least one of: a word processing application; a spreadsheet application; and a messaging application.

20. The system of claim 17, wherein attaching the selected file to the electronic message comprises attaching a link to the selected file.

* * * * *